(12) United States Patent
Johnson

(10) Patent No.: US 6,832,289 B2
(45) Date of Patent: Dec. 14, 2004

(54) SYSTEM AND METHOD FOR MIGRATING DATA

(75) Inventor: Richard H. Johnson, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 408 days.

(21) Appl. No.: 09/976,958

(22) Filed: Oct. 11, 2001

(65) Prior Publication Data

US 2003/0074523 A1 Apr. 17, 2003

(51) Int. Cl.[7] .............................. G06F 12/16; H02H 3/05
(52) U.S. Cl. ........................ 711/112; 711/161; 711/162; 711/165; 714/7
(58) Field of Search ................................ 711/112, 161, 711/162, 165; 714/7

(56) References Cited

U.S. PATENT DOCUMENTS 5,680,640 A   10/1997  Ofek et al. ................. 395/839
6,374,327 B2 * 4/2002  Sakaki et al. ............... 711/112
6,625,705 B2 * 9/2003  Yanai et al. ................. 711/162
6,647,476 B2 * 11/2003 Nagasawa et al. ........... 711/165

* cited by examiner

Primary Examiner—Jack A. Lane
(74) Attorney, Agent, or Firm—David W. Victor; Konrad Raynes & Victor LLP

(57) ABSTRACT

In a computer system having memory in a processor and a plurality of attached heterogeneous disk storage subsystems, a system and method for managing the storage subsystems is provided. A volume of data is copied from a first disk storage subsystem from a first vendor to a second disk storage subsystem from a second vendor, of equal or greater capacity than the first disk storage subsystem, without requiring specialized hardware. An application program is able to access the data on the first disk storage subsystem while the data is being copied. The volume of data on the second disk storage subsystem is identified, within the computer system, as the volume of data on the first disk storage subsystem after the data is copied.

18 Claims, 4 Drawing Sheets

SYSTEM AND METHOD FOR MIGRATING DATA

FIELD OF THE INVENTION

This invention relates to enterprise storage systems comprising a host computer attachable to a plurality of storage devices, more particularly this invention relates to a system and method for migrating data from a first disk storage subsystem to a second heterogeneous disk storage subsystem without interrupting access to the data and without requiring special hardware.

BACKGROUND OF THE INVENTION

In a network enterprise computing system, a host computer runs application programs which access data stored on attached storage devices. The storage devices can be disk drives, tape drives or storage subsystems such as Redundant Array of Independent Disks (RAID) systems which comprises a plurality of disk drives. The host computer runs an operating system such as the UNIX based IBM AIX operating system. The hosts are attached to the storage devices through adapters and interfaces such as the Small Computer Storage Interface (SCSI) or FibreChannel Interface.

Depending on the compatibility provided by the host computer, there are a variety of storage subsystems from various vendors that can be attached to the host computer. An example of a storage subsystem is the IBM Enterprise Storage Server (ESS). The ESS subsystem stores a plurality of volumes of data which can be accessed by a host computer system. The ESS subsystem is a RAID system that also uses redundant connections and paths between the host server and disk storage devices to provide enhanced performance and data availability.

For optimal data availability, a host server computer system is configured with multiple host adapters with SCSI or Fibre Channel connections to an ESS system that in turn provides internal component redundancy.

The storage devices are physically attached to the host computers through adapter hardware. Host adapter driver software controls the host adapter hardware.

The IBM Subsystem Device Driver (SDD) software product behaves like a pseudo device driver and interfaces between the host file system and the host disk drivers. The SDD resides in the host server in communication with the native disk device driver for the computer system. The SDD software product coordinates directing data flow. For example, the SDD driver selects an alternate path in the event of a failure in a data path. The IBM Subsystem Device Driver is available on AIX, UNIX, HP, SUN Solaris, Microsoft Windows NT and Microsoft Windows 2000 hosts.

In an AIX host, for example, the SDD software resides above the AIX disk driver in the AIX protocol stack. The SDD defines virtual storage devices used by the system. Each SDD device represents a unique device the storage subsystem. In an AIX environment, the SDD devices behave like AIX hdisk devices. Most operations on a hdisk can be performed on the SDD device, including commands such as open, close and data transfer. Application program on the host system access data via the virtual volumes (e.g. an AIX operation system hdisk). The data volumes are physically stored on one or more physical disk storage devices of a subsystem. The physical storage of the data is controlled by the subsystem.

I/O requests sent to the SDD driver are passed to the AIX disk driver after path selection. When an active path experiences a failure, the SDD driver dynamically switches to another path. The SDD driver dynamically balances a load based on the workload of the adapter.

Before installing the Subsystem Device Driver, the ESS is configured for single port or multiple port access for each logical unit number. The subsystem device driver requires a minimum of two independent paths that share the same logical unit to use the load balancing and fail-over features. For Fibre Channel support, the AIX host system preferably runs on an IBM RS6000 computer.

The host computer runs a device configuration manager which, at the time the system is started up, queries all of the attached storage devices (e.g. subsystems) to identify the location and quantity of data storage available for the system. Within the provided operating system, a file management system tracks the location of all stored files in the identified storage devices.

It is currently possible to perform a data migration operation from one storage device to another by taking an application program out of service, copying the data and then bringing the application back on-line with the new device. If the amount of data is large this can result in a lengthy application outage. There is a need to facilitate the transferring of data from one device to another while application programs are accessing the data being moved. Therefore, it is desirable to migrate disk resident data from one storage device to another without requiring that the application using the data on the storage device be taken out of service.

Computer systems have been known to incorporate background copying where the application programs can access the data while the data is being copied. Examples of data migration systems that allow background copying are the IBM Peer-to-Peer Remote Copy (PPRC) and Flashcopy products. These products serve to meet certain data copying needs. However, the data copying is performed using special hardware provided in the storage subsystem.

Another example of a background copying system is described in U.S. Pat. No. 5,680,640. However, that system requires specialized hardware in a specific type of storage subsystem to perform the data migration. Both the source and target subsystems must be the same device type and storage capacity and the system is limited to one type of attachment, the ESCON system.

It is desirable to be able to perform data migration without requiring any hardware-specific additions to a storage system or an enterprise system. Therefore, it is desirable to have a software program that will accomplish the on-line copying of data. It is also desirable that the capability of the on-line copying of data be available in the SCSI and Fibre Channel environments. Additionally, it is also desirable to provide a system where the source and target storage subsystems are from different vendors.

SUMMARY OF THE INVENTION

It is an object of the preferred embodiment of the invention to provide a system and method for migrating disk-resident data from one disk device to another of equal or greater capacity without requiring that the application program using the disk device be taken out of service.

It is a further object of the preferred embodiment of the invention to migrate data from one disk subsystem to another subsystem manufactured by a different vendor.

It is a further object of the preferred embodiment of the invention to migrate disk-resident data from one subsystem to another without requiring special hardware wherein a host application program controls the migrating of the data between whatever subsystem is used.

In a computer system having a memory, processor and a plurality of attached heterogeneous disk storage subsystems, a system is provided for managing the disk storage subsystems comprising means for copying a volume of data from a first disk storage subsystem from a first vendor to a second disk storage subsystem from a different vendor from the first wherein the second disk storage subsystem is of equal or greater capacity than the first storage subsystem. Means are also provided for enabling an application program to access data on the first disk storage subsystem while data is being copied to the second disk storage subsystem. Means are further provided for identifying within the computer system the copied volume on the second disk storage subsystem as the volume on the first disk storage subsystem after all the data is copied. Means are further provided for indicating how much data has been copied from the volume on the first disk storage subsystem to the second disk storage subsystem and for writing updated data to both the first and second disk storage subsystems when the data being updated has already been copied to the second disk storage subsystem. Means are further provided for uniquely identifying all the volumes on the attached disk storage subsystems and means are provided for maintaining the unique identity of the volume on the first disk storage subsystem until all of the data has been copied to the second disk storage device.

In a further preferred embodiment, a method is provided for copying a volume of data from a first storage device to a second storage device attached to a host system, having a processor and memory, while allowing application programs, running on the host system, to access the data on the first storage device, wherein each volume on the storage device has a unique identifier. The method comprises the steps of issuing a request to the first storage device to copy each sector of data currently stored in the volume to be copied in the first storage device to the second storage device. Each sector of data is written into a buffer in the host computer. Each sector of data is then written from the buffer in the host computer to the second storage device. A copy counter is updated after a sector has been successfully copied. When all of the data in the volume to be copied in the first storage device is successfully copied to the second storage device, the volume in the second storage device is uniquely identified as being the volume in the first storage device, and the first identifier for the copied volume in the first storage device is modified so as to no longer be uniquely identified as such.

In a preferred embodiment, all I/O requests are intercepted for the first storage device. When writing updated data to the first storage device, a determination is made whether the sector of data to be updated has been copied to the second storage device as indicated by a counter. When the sector of data to be updated has been copied to the second storage device, the updated data is written to both the first storage device and the second storage device. Also, preferably, metadata is provided in a designated sector of the volume in the first storage device to uniquely identify the volume in the first storage device. That sector containing the metadata is only copied to the second storage device after all the other data in the volume has been copied from the first storage device. In a further preferred embodiment, the first and second storage devices are from different manufacturers.

In a further preferred embodiment, an article of manufacture is provided for use in managing a plurality of heterogeneous disk storage devices attached to a computer system having a processor and a memory. The article of manufacturer has computer program code embedded in a medium which causes the computer system to perform the steps for managing the attached disk storage devices. The system copies a volume of data from a first disk storage device from a first manufacturer to a second storage device from a different manufacturer of equal or larger capacity. An application program running on the system is still able to access data stored on the first disk storage device while the data is being copied. The volume on the second disk storage device is identified within the computer system as the volume on the first disk storage device after all the data has been copied.

DETAILED DESCRIPTION OF THE PREFERRED EMBODIMENT

Figure 1:
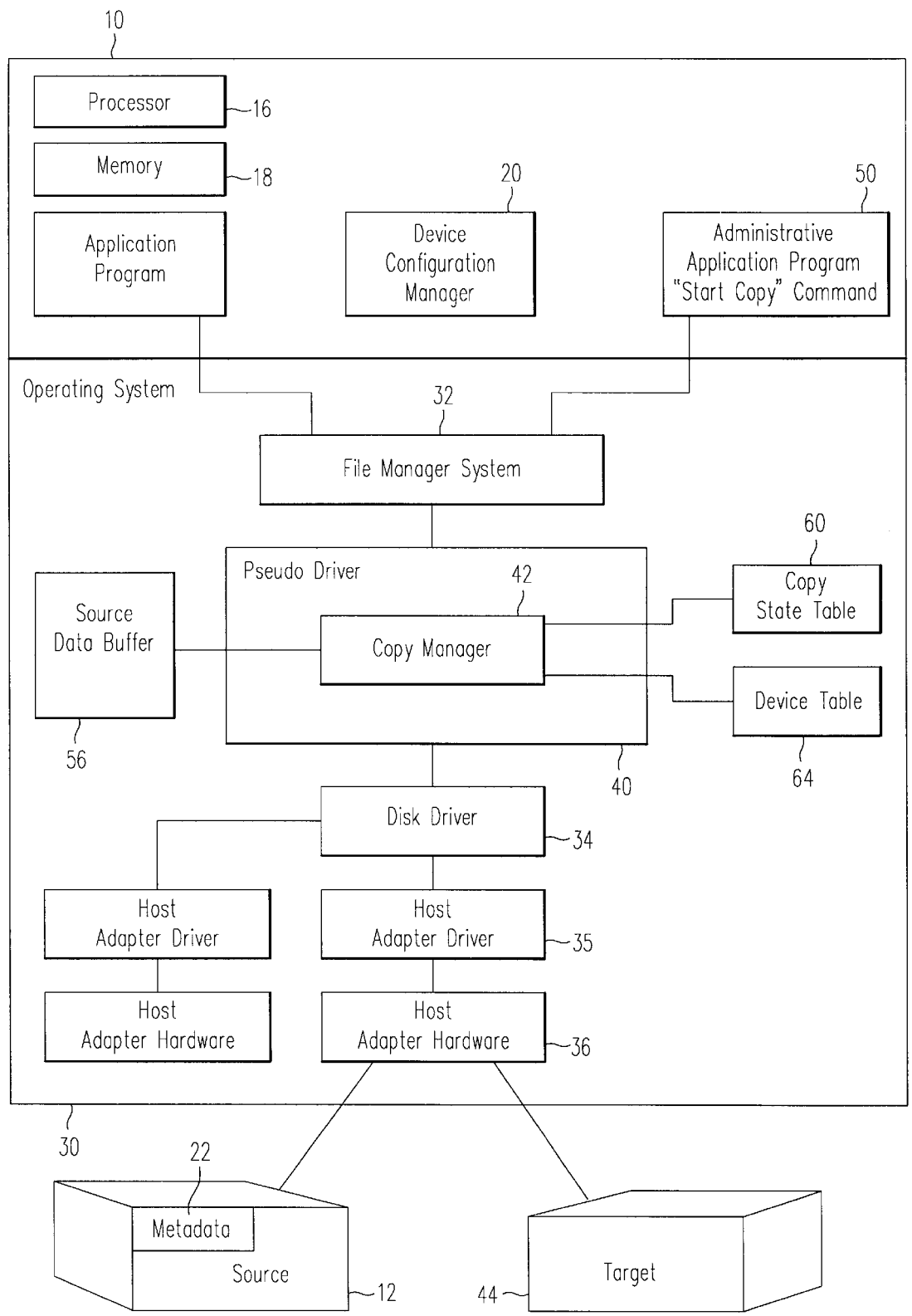
FIG. 1 is a block diagram of a computer system including storage devices and host system adapters according to the referred embodiment of the invention.

Referring to FIG. 1, a host computer system 10 is connected to a plurality of storage devices including storage subsystems. The host system is, for example, an IBM RS/6000 computer system running the IBM AIX operating system. Alternatively, the host computer system can be a SUN, HP or Windows NT system or other system known to those skilled in the art. The host system is attached to the storage subsystems by a SCSI or FibreChannel connection which controls the flow of data to and from the storage subsystem attached to the host. The storage subsystem can be from a variety of vendors. An example of a storage subsystem is the IBM Enterprise Storage Server (ESS) subsystem. However, other storage systems that are known to those skilled in the art may also be used.

The CPU within the host system executes program instructions that are stored in the operational memory. These instructions may be loaded into the operational memory through an optional program storage reader. The invention may be implemented using any combination of computer programming software, firmware or hardware. As a preparatory step in practicing the invention or constructing the apparatus according to the invention, the computer programming code, whether software or firmware, according to the invention, will typically be stored in one or more machine readable storage devices such as a fixed hard disk drive, a CD ROM drive, a diskette, an optical disk, magnetic tape or semiconductor memory thereby making an article of manufacture according to the invention. The article of manufacture containing the computer programming code is used by either executing the code directly from the machine readable storage device or by copying the code from the storage device into another storage device such as a hard disk drive, a DRAM, etc., or by transmitting the code on a network for remote execution. The method form of the invention may be practiced by combining one or more machine readable storage devices containing the code according to the invention with appropriate standard computer hardware to execute the code contained therein. An apparatus for practicing the invention can be one or more computers containing or having network access to computer programming code according to the invention.

The host computer 10 has a processor 16 and memory 18 which are used in running application programs. The application programs access data stored on the attached storage devices 12. The host computer expects to access data from virtual volumes comprising a plurality of sectors. The size of the volumes can range from half a gigabyte to hundreds of gigabytes. For example, an AIX host accesses data from multiple hdisk volumes. The hdisk volumes' data physically resides on one of the plurality of disk drives in an ESS subsystem, for example.

The host system also runs a device configuration manager 20. The device configuration manager is activated when the system is started up, or when specifically accessed, to query all attached storage devices to determine each devices' identity and storage capacity. Each virtual volume of data, such as hdisk, typically has metadata 22 stored in the first N sectors of the volume that uniquely identifies the volume for the host. This identifier is assigned by a customer engineer, who configures subsystem storage areas.

Within the operating system 30 of the host computer 10, a file manager 32 identifies, for each file, the volume and storage subsystem where the file can be located. The file manager typically is attached to a host disk driver 34 which coordinates the I/O requests between the application programs and the storage devices where the data is physically stored.

An example of a host disk driver is a SCSI driver which coordinates accesses to the storage systems, interfacing with the subsystem, as is well known by those skilled in the art. The SCSI disk driver builds the SCSI commands needed to access or store the requested data. The disk driver sends the SCSI commands to the selected adapter driver 35 which sends the commands over the host adapter hardware 36 to the storage device containing the requested data. The adapter driver 34 controls the adapter hardware 36 which interfaces with the attached storage subsystems. Typically, a single SCSI disk driver interfaces with multiple adapter hardware connectors through the appropriate driver software.

In the preferred embodiment, residing above the host disk driver 34, within the operating system 30, a pseudo device driver (filter) 40 is installed to provide greater flexibility and functionality of the disk and adapter drivers by providing greater control of the flow of data between the application programs and the stored data.

The present invention makes use of such a filter, or pseudo device driver, to intercept disk I/O requests from an application program and route the requests to a particular disk device controlled by the system disk device driver. An example of a pseudo device driver is the IBM Subsystem Device Driver (SDD) program which provides additional fail over protection and optimizes the flow of data to the attached storage subsystems.

In the preferred embodiment of the present invention, a copy manager 42 resides within the pseudo driver 40 to coordinate the copying of data from a source subsystem 12 to a target subsystem 44.

Prior to beginning the copying process, the host system 10 is attached to the source storage subsystem 12. The first step in the copying process is to also attach the target disk storage system 44 to the host system 12. Attaching the subsystems may include a combination of manual electrical connections and some software programming of the interface. The target subsystem is physically coupled to the host system through one of the system's ports 36 and hardware. The device driver software 34 and the programming interface are used to connect the target subsystem 44 to the host 10. Preferably, the target subsystem 44 is empty. It is required that the target system have equal or greater capacity than the source subsystem. Alternatively, the source 12 and target 44 subsystem may both be concurrently attached to the host system 10 where the target subsystem 44 has the storage capacity to receive the copied data from the source subsystem 12.

After all desired data has been copied from the source subsystem 12 to the target storage subsystem 44, the source storage subsystem 12 may be physically disconnected from the host 10. Additional reprogramming of the programmable interface 34 is also required. Alternatively, after the copying is complete, the host system 10 may continue to operate with the source subsystem 12 physically linked to the host 10 as well.

A device control call (a "Start Copy" command) is sent by the administrative application program 50 to the copy manager 42 in the pseudo device driver filter 40 requesting that the driver initiate a copy of all the data on one active disk device 12 (which is designated as the source) to another disk device 44 which is designated as the target. Both devices are under the control of the pseudo device driver 40. The pseudo device driver 40 initiates a copy of all disk blocks from the source to the target. In the preferred embodiment, the copy manager copies a requested volume. In order to copy all the data from a first subsystem to another subsystem, the administrator would issue a command to copy all volumes currently stored in the first subsystem.

The administrative application program 50 is used to coordinate the process. The administrative application program inputs the information to the system regarding the source and target volume identifications. These tasks may be accomplished, for example, by a system administrator issuing appropriate commands to, for example, identify the source subsystem volumes to be copied and defining the target subsystem volumes.

Figure 2:
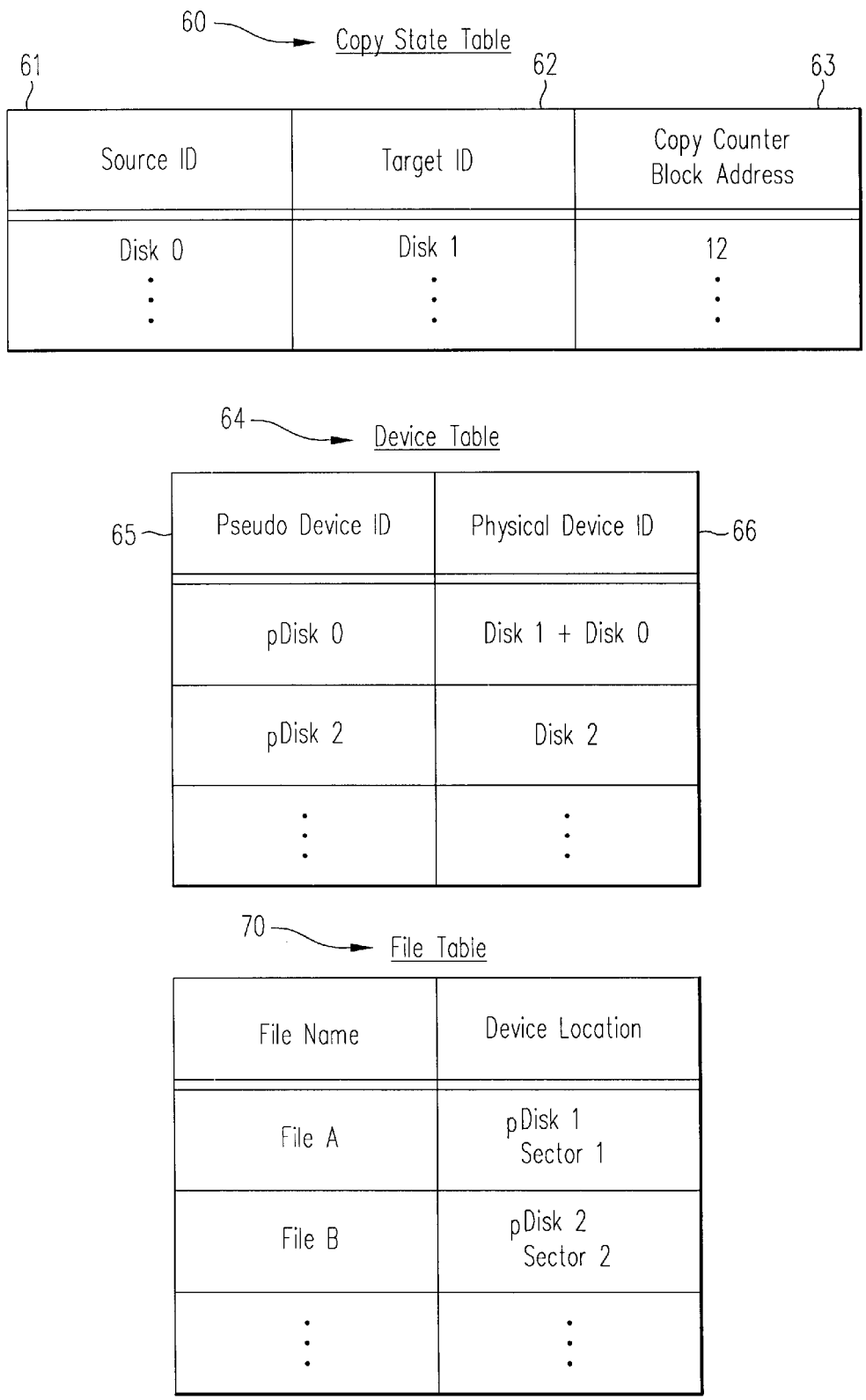
FIG. 2 is a representation of the control structures and tables used in a preferred embodiment of the invention.

Referring to FIG. 2, the copy manager 42 uses the provided information to setup a Copy State Table 60 which indicates the storage volume ID 61 of the source volume 12, the storage volume ID 62 of the target volume 44, and initiates a copy counter 63 to indicate which block is currently being copied. The administrator also provides the information in terms of where the copying should begin. For example, whether sectors 0 through N are used for a unique device identifier. Alternatively, the system administrator can provide a list of specific sectors to copy to limit the amount of copying from the source subsystem to the target subsystem or how much data is to be copied in any one transfer.

For ease of explanation without any limitation intended thereby, the invention is described using data items referring to volumes sectors and blocks. It is understood that the present invention is not limited by that terminology.

A copy master list (not shown) is also used to identify which sectors are to be copied. The copy master list may refer to all sectors in the source subsystem or selected sectors (such as all sectors in a logical volume) depending on the application. Even when an entire volume is to be copied, efficiency can be gained by copying only those sectors that have actual data currently stored on those sectors.

A File Table 70 is used by the file manager to identify, for each file name 71, the disk location 72 of the file based on the pseudo disk name provided by the pseudo device driver 40. So, for example, a file being used by the application program with the name "File A" would be directed to a pseudo disk, for example, pDisk0. An address is also provided as to which sector the file would be found in that volume.

The copy manager 42 also uses a Device Table 64 to manage the copying of the data. The Device Table provides a mapping between pseudo device IDs 65 and the physical device IDs 66 for each attached subsystem. For example, pDisk0, which is the storage device identifier used by the file manager, is defined by the Copy State Table as Disk0. When a copy is being made of a storage device volume (e.g. Disk0) or portion thereof, the pseudo device driver directs that data be copied to both the source (e.g. Disk0) and the target (e.g. Disk1) storage devices. The Device Table is updated to indicate this arrangement by defining pDisk0 as Disk1 and Disk0.

In the preferred embodiment, the data is first copied from the source subsystem into a buffer 56 in the host system. The data is then copied out to the target subsystem. The Copy State Table identifies which sector is currently being copied and whether or not it has been successfully copied. The target subsystem reports a successful copy to the host and the Copy State Table is updated accordingly. The host then redirects all I/O requests for the source subsystem up to that sector to be written to both the source and the target subsystem without requiring that the host buffer be used to store the data. I/O requests from an application program to the source subsystem for a read request only go to the source subsystem as usual. There is no need to access the target for read requests as long as the source subsystem remains active and online.

More particularly, when an I/O request is a data access command, the host system examines the I/O request to identify the address of the requested data. If the requested data is in a portion of the source subsystem that has already been copied and the access request is a write operation, then a write is performed to both subsystems.

Figure 3:
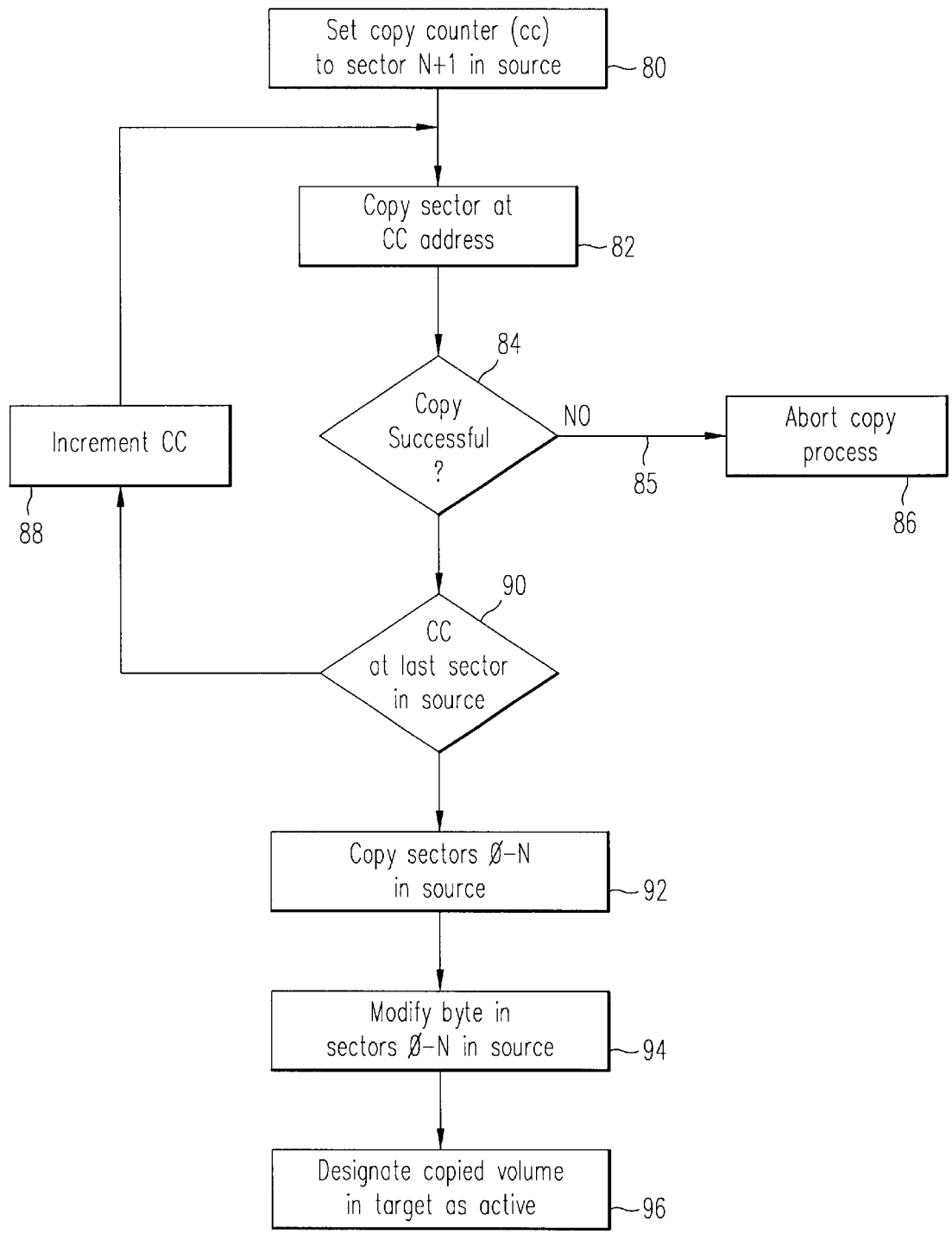
FIG. 3 is a flow diagram showing the process for copying data from a first storage device to a second storage device according to the preferred embodiment of the invention.

FIG. 3 shows the flow of the procedure for copying all data from volume A in subsystem A to volume B in subsystem B. The first step is to set the copy counter to refer to sector N+1 in the source (volume A) 80.

The first N sectors on the source are copied after all the other source blocks when the first N sectors are used as a unique identifier for the storage device. At the time of initiation, when the host system is powered up, the device configuration manager queries all the attached volumes and uniquely identifies each one using the identifier stored in the first N sectors of each volume. If sectors 0 through N are copied immediately, and the copy process can not be completed due to an error, the operating system could encounter a duplicate volume. This would cause a loss of access to data or data integrity exposures. In the event there is a problem with the copy operation, a recovery is still possible as long as the identifier sectors are not copied, since the host would still only recognize one unique volume.

After the sector indicated by the copy counter address 63 is copied from the source to the target 82, a determination is made if the copy was successful 84. If the copy was not successfully completed 85 then the copy process is terminated 86. Otherwise, the copy counter is incremented 88, unless the copy counter is already pointing to the address at the last sector of the source volume 90. If the copy counter is incremented, then the process continues to copy every sector until every sector has been copied, other than the first N sectors (the volume identifier).

After the last sector of data, from sector N+1 to the last sector of the source volume, is copied to the target, the data in sectors 0 to N are copied from the source to the target 92. After the first N-sectors are copied successfully, one of the bytes of data in sectors 0 through N in the source volume is modified 94. That way, only the target volume will have the unique identifier of the source volume. The source volume will no longer be known to the host. The copied volume in the target storage device is then designated as the active volume 96. The device table 64 control structure is updated to indicate that the pseudo device ID, pDisk0, now references only Disk1 where as before the copy process pDisk0 referenced Disk0 (during the copy process, pDisk0 referenced Disk1 and Disk0). The Copy State Table 60 and Device Table 64 are also updated to indicate that Disk0 is no longer being copied.

Figure 4:
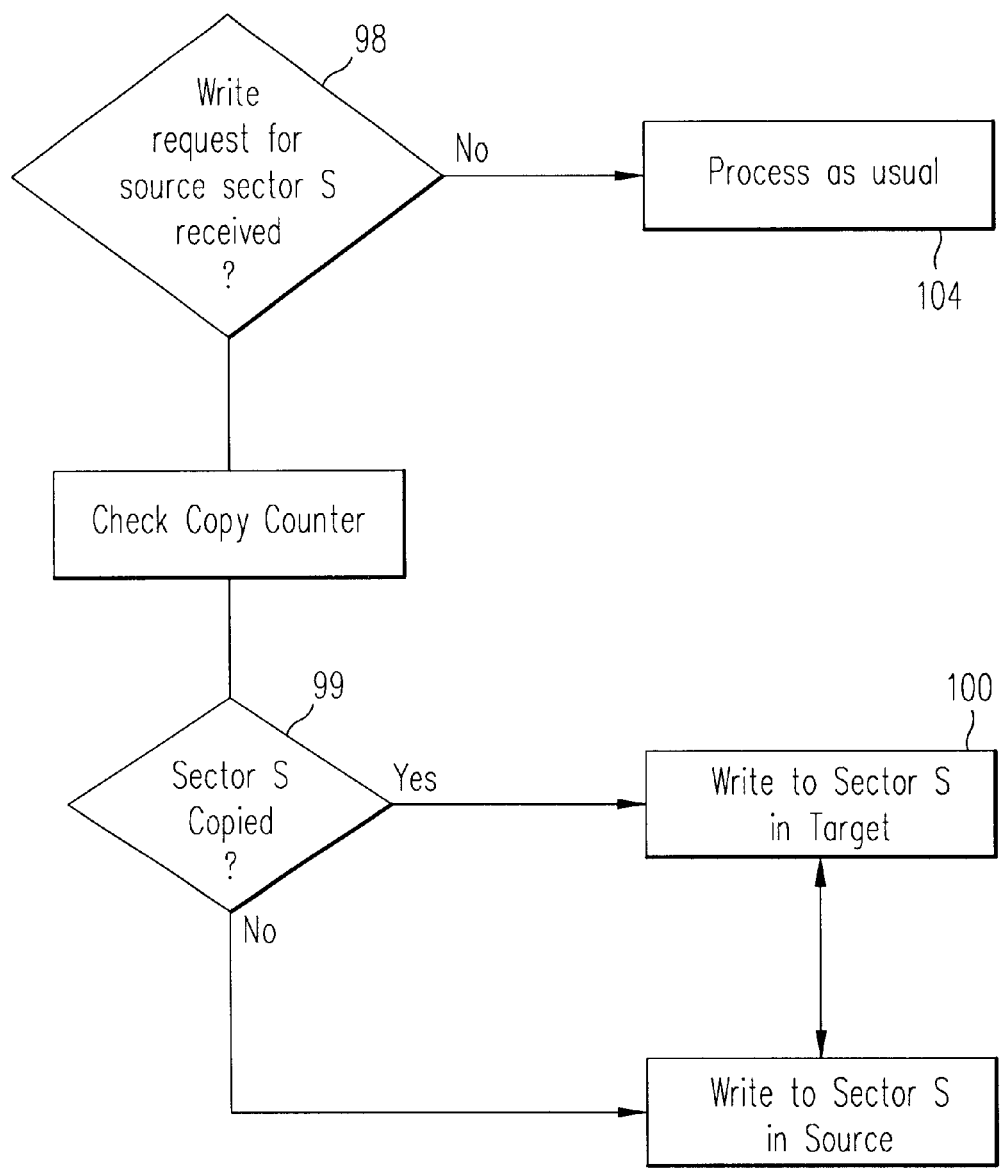
FIG. 4 is a flow diagram showing the process for writing data to a source storage device while copying data to a target storage device according to the preferred embodiment of the invention.

Referring to FIG. 4, the copy manager intercepts all I/O operations. When a write request for the source storage device is intercepted 98 a determination is made as to whether the sector received has been copied yet 99. Write operations for source sectors referencing sectors not yet copied are written only to the source 100. Write operations to update a source sector that has already been copied are routed to both the source and target by the device driver 102. If a write request is encountered, not for the source, then it is processed as usual 104.

Any permanent I/O errors encountered while trying to copy a source block to the target will cause the migration operation to fail and all I/O operations will revert back to the source only. Once all source data has been copied to the target, the filter device driver begins routing all I/O operations to the target only and the source device will no longer be accessed.

While there have been shown the preferred embodiment of the invention will be apparent to those skilled in the art that various changes and modifications can be made herein without departing from the scope of the invention defined by the appended claims.

I claim:

1. In a computer system having a processor and memory, wherein the computer system is attachable to a plurality of heterogeneous disk storage subsystems, a system for migrating data between attached disk storage subsystems comprising:

means for copying a volume of data from a first attached disk storage subsystem from a first vendor to a second attached disk subsystem from a different vendor from said first wherein said second disk storage subsystem is of equal or larger capacity than said first disk storage subsystem;

means for enabling an application program to access data in the first disk storage subsystem while data is being copied;

means for identifying, within the computer system, the second volume as the first volume after all the data is copied;

means for indicating how much data has been copied from the data volume in the first disk storage subsystem to the data volume in the second disk storage subsystem; and means for writing undated data to both the first disk storage subsystem and the second disk storage subsystem when data being updated has been copied to the second disk storage subsystem.

2. The computer system of claim 1 further comprising:

means for uniquely identifying all of the attached data volumes; and means for maintaining the unique identity of the data volume in the first disk storage subsystem until all of the data has been copied to the data volume in the second disk storage subsystem.

3. The computer system of claim 1, wherein the means for of copying the data volume from the first storage device to the second storage device comprises the further steps of:
  (a) issuing a request to the first storage device to copy each sector of data the data volume stored in the first storage device to the second storage device;
  (b) writing each sector of data into a buffer in the computer system;
  (c) writing each sector of data from the buffer in the computer system to the second storage device; and
  (d) updating a copy counter after a sector has been successfully copied.

4. The computer system of claim 3, further comprising:
means for writing updated data to the first storage device by:
  (i) intercepting all i/o requests for the first storage device;
  (ii) determining whether the sector of data to be updated has been copied to the second storage device as indicated by the copy counter; and
  (iii) when the sector of data to be updated has been copied to the second storage device, writing the updated data to both the first storage device and the second storage device.

5. The computer system of claim 3, further comprising:
means for providing metadata written in a designated block of sectors of the data volume in the first storage device to provide a unique identifier; and
means for copying the block of sectors containing the metadata of the data volume in the first storage device to the data volume in the second storage device only after all of the other data sectors have been copied to data volume in the second storage device.

6. The computer system of claim 3, wherein the first and second storage devices are disk storage subsystems from different manufacturers.

7. In a computer system having a memory, a processor, and a plurality of attached heterogeneous storage devices, a method for managing the storage of data on the storage devices comprising:
  (a) copying a data volume from a first storage device to a data volume in a second storage device of equal or larger capacity than the first storage device;
  (b) enabling an application program running on the computer system to access the data on the first storage device while the data is being copied;
  (c) identifying, in the computer system, the data volume in the second storage device as the data volume in the first storage device after all the data is copied from the first data volume to the second data volume;
  (d) indicating how much data has been copied from the first data volume to the second data volume; and
  (e) writing undated data to both the first data volume and the second data volume when the data being undated has been copied to the second data volume.

8. The method of claim 7, further comprising:
uniquely identifying all of the data volumes in the attached storage devices; and
maintaining the unique identity of the data volume stored in the first storage device until all of the data volume has been copied to the second storage device.

9. The method of claim 7 wherein copying the data volume from the first storage device to the second storage device comprises:
  (a) issuing a request to the first storage device to copy each sector of data in the data volume stored in the first storage device to the second storage device;
  (b) writing each sector of data into a buffer in the computer system;
  (c) writing each sector of data from the buffer in the computer system to the second storage device; and
  (d) updating a copy counter after a sector has been successfully copied.

10. The method of claim 9, further comprising:
when writing updated data to the first storage device:
  intercepting all i/o requests for the first storage device;
  determining whether the sector of data to be updated has been copied to the second storage device as indicated by the copy counter; and
  when the sector of data to be updated has been copied to the second storage device, writing the updated data to both the first storage device and the second storage device.

11. The method of claim 9, further comprising:
providing metadata written in a designated block of sectors of the data volume in the first storage device to provide a unique identifier; and
copying the block of sectors containing the metadata of the data volume in the first storage device to the data volume in the second storage device only after all of the other data sectors have been copied to data volume in the second storage device.

12. The method of claim 9 wherein the first and second storage devices are disk storage subsystems from different manufacturers.

13. An article of manufacture for use in migrating data in a computer system having a processor and memory, the article of manufacture having computer program code which causes the computer system to:
  copy a volume of data from a first attached disk storage device from a first manufacturer to a second attached disk storage device from a different manufacturer wherein said second disk storage device is of equal or larger capacity than said first disk storage device;
  enable an application program to access the data on the first disk storage device while the data is being copied;
  identify, within the computer system, the volume of data on the second disk storage device as the volume of data on the first disk storage device after all the data is copied;
  indicate how much data has been copied from the volume of data in the first disk storage device to the volume of data in the second disk storage device; and
  write undated data to both the first disk storage device and the second disk storage device when the data being undated has been copied to the second disk storage device.

14. The article of manufacture of claim 13 wherein the computer programming code further causes the computer system to:
  uniquely identify all of the volumes of data on the attached disk storage devices; and
  maintain the unique identity of the volume of data on the first disk storage device until all of the data in that volume has been copied to the second disk storage device.

15. The article of manufacture of claim 13, wherein copying the data volume from the first storage device to the second storage device comprises:
- (a) issuing a request to the first storage device to copy each sector of data in the data volume stored in the first storage device to the second storage device;
- (b) writing each sector of data into a buffer in the computer system;
- (c) writing each sector of data from the buffer in the computer system to the second storage device; and
- (d) updating a copy counter after a sector has been successfully copied.

16. The article of manufacture of claim 15, wherein the computer code further causes the computer system when writing updated data to the first storage device to:

intercept all i/o requests for the first storage device;

determine whether the sector of data to be updated has been copied to the second storage device as indicated by the copy counter; and when the sector of data to be updated has been copied to the second storage device, writing the updated data to both the first storage device and the second storage device.

17. The article of manufacture of claim 15, wherein the computer code further causes the computer system to:

provide metadata written in a designated block of sectors of the data volume in the first storage device to provide a unique identifier; and copy the block of sectors containing the metadata of the data volume in the first storage device to the data volume in the second storage device only after all of the other data sectors have been copied to data volume in the second storage device.

18. The article of manufacture of claim 15, wherein the first and second storage devices are disk storage subsystems from different manufactures.

* * * * *